Jan. 12, 1937.　　　E. R. MORTON　　　2,067,500
REGULATOR SYSTEM
Filed May 22, 1935　　　2 Sheets-Sheet 1

INVENTOR
E. R. MORTON
BY Wayne B Wells
ATTORNEY

Jan. 12, 1937.  E. R. MORTON  2,067,500
REGULATOR SYSTEM
Filed May 22, 1935  2 Sheets-Sheet 2

INVENTOR
E. R. MORTON
BY
Wayne B Wells
ATTORNEY

Patented Jan. 12, 1937

2,067,500

UNITED STATES PATENT OFFICE

2,067,500

REGULATOR SYSTEM

Edmund R. Morton, New York, N. Y., assignor to Bell Telephone Laboratories, Incorporated, New York, N. Y., a corporation of New York Application May 22, 1935, Serial No. 22,681

11 Claims. (Cl. 171—119)

This invention relates to regulator systems and particularly to precision regulator systems.

One object of the invention is to provide a vacuum tube regulator system that shall neutralize the reactance in the output circuit thereof in an improved manner.

Another object of the invention is to provide a vacuum tube regulator system that shall have a space discharge device provided with a large dynamic impedance to neutralize the reactance in the output circuit of the system and improve the stability of the regulating operation.

Another object of the invention is to provide a dynamo-electric machine with a regulator system of the space discharge type that shall control a machine winding to maintain a characteristic of the machine constant and that shall have a space discharge device with a large dynamic impedance connected to said machine winding to extend the range and improve the stability of the regulating operation.

A further object of the invention is to provide an electric motor with a regulator system of the space discharge type that shall control a field winding of the motor to maintain the motor speed substantially constant and that shall have a space discharge device of the screen grid type with a large dynamic impedance connected in the load circuit to said field winding to improve the stability of the regulating operation.

In mechanical governors it is well known that the inertia of the governor delays the action of the governor and tends to cause the so-called hunting action. This hunting action is particularly troublesome in governors of the precision type. In an electric regulator system, for example, a space discharge regulator system, the reactance in the load circuit or the output circuit of the system is the equivalent of inertia in a mechanical governor. Reactance in the load circuit of an electric regulator system tends to produce hunting action in the same manner that inertia in a mechanical governor system tends to produce hunting action. The reactance in the load circuits of electrical regulators aids in producing hunting action which must be corrected by the addition of circuit devices to insure satisfactory regulation.

In electric regulators of the space discharge type now in service a three-electrode space discharge device is in the load circuit. The plate current in a three-element space discharge device is a function of the plate voltage. Consequently reactance in the load circuit of a three-element space discharge device will delay the building up of the device current to its correct value. The three-element space discharge device connected to the load circuit of an electric regulator system will delay the building up of the regulating current to its correct value by reason of the reactance in the load circuit. This delay in the building up of the regulating current tends to produce hunting action.

According to the present invention it is found that space discharge devices having a number of grid elements may be designed to have a space current characteristic substantially independent, over wide ranges, of the plate voltages. A screen grid space discharge device or a pentode space discharge device has a large dynamic impedance and therefore may have a space current characteristic substantially independent of the plate voltage for wide ranges. An electric regulator system having a screen-grid space discharge device or a pentode space discharge device connected to the load circuit will overcome the delay caused by reactance in the load circuit and increase the stability of the regulating operation. The characteristic of a screen-grid space discharge device or a pentode space discharge device in having a plate current substantially independent of the plate voltage enables their use with higher resistance and therefore higher power absorption in a load circuit, since they deliver their rated current at low values of plate voltage. The above feature of neutralizing the reactance of a load circuit is applicable to any vacuum tube regulator circuit having a space discharge device connected to a reactive load circuit. The regulator system may be employed to regulate a motor, a generator or a static apparatus.

In one system employed to illustrate the invention, the speed of a motor is maintained substantially constant by regulating the current supplied to a regulating field winding. The system which is employed to illustrate the invention applied to a motor is disclosed in the E. R. Morton Patent 1,788,734, dated January 13, 1931. A motor having an armature winding and a field winding drives an inductor generator which produces an alternating current having a frequency varying according to the speed of the motor. The inductor generator is connected to two opposite vertices of a bridge circuit having one arm thereof tuned to the frequency of the generator when the motor is operating at normal speed. A phase detector tube has the input circuit thereof connected to the vertices of the bridge circuit opposite to the vertices connected to the generator. Alternating potential is supplied to the anode circuit of the phase detector tube from the inductor alternator. The phase detector tube is operated in accordance with the phase relation between the potential impressed upon the grid from the bridge circuit and the potential impressed upon the anode from the generator. The phase of the potential impressed upon the grid of the bridge circuit varies in accordance with the frequency of the alternating current so that the output from the phase detector tube varies in accordance with the speed of the motor.

The phase detector tube is coupled to a thermionic amplifier by means of a resistance element. The amplifier tube is directly connected to a regulating field winding of the motor for controlling the motor field excitation to maintain the motor speed constant. The amplifier tube connected to the regulating field winding is preferably a pentode tube having a screen grid. A space discharge device having a screen grid will neutralize the reactance of the regulating field winding over a wide range. The reactance of the regulating field winding unless neutralized will have a tendency to produce hunting action. The neutralization of the reactance of the regulating field winding is effected by means of the large dynamic impedance of a space discharge device having a screen grid.

In another form of the invention, a regulating field winding of a generator is controlled to maintain the voltage of the generated current substantially constant. The load circuit, including the regulating field winding of the generator, is connected to a pentode tube in the regulating system. The pentode tube has a large dynamic impedance in order to insure that the reactance of the regulating field winding does not delay the regulating operation in a manner to produce hunting action.

In the accompanying drawings, Fig. 1 is a diagrammatic view of a motor speed regulator system constructed in accordance with the invention;

Figure 1:
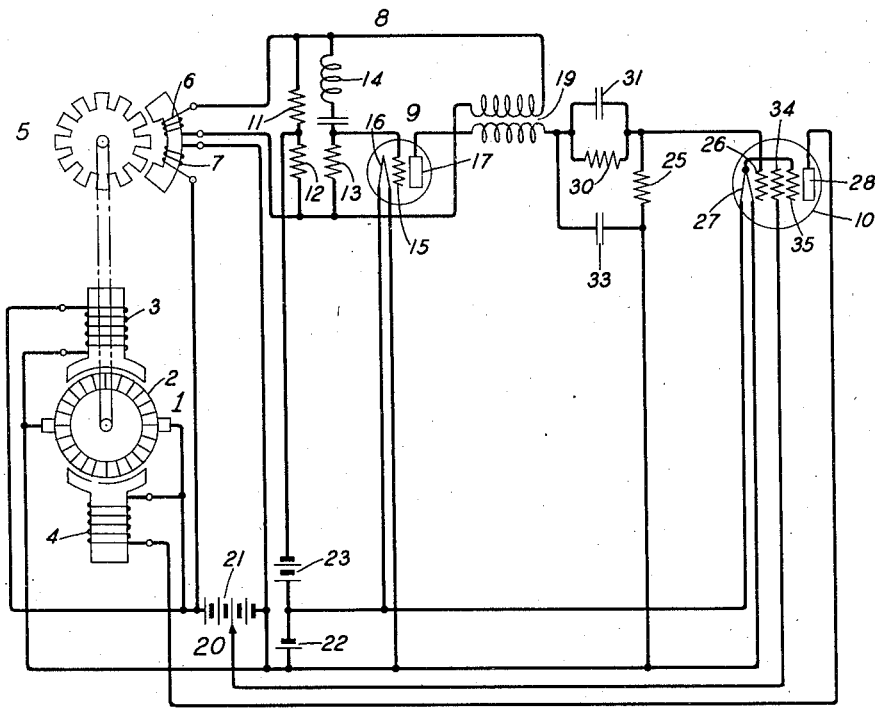

Referring to Fig. 1 of the drawings, a motor 1 comprising an armature 2, a shunt field winding 3 and a regulator field winding 4 is directly connected to an inductor alternator 5. The inductor alternator 5 is provided with an armature winding 6 and a field winding 7. The alternator 5 being directly connected to the motor 1 will produce an alternating current having a frequency varying according to the speed of the motor. The excitation of the regulator field winding 4 is controlled by the alternator 5 operating through a bridge circuit 8, a phase detector tube 9 and a pentode regulator tube 10 serving as an amplifier. The bridge circuit 8 comprises three resistance arms 11, 12 and 13 and an arm 14 in the form of a tuned circuit. The bridge arm 14 is tuned to the frequency of the alternator 5 when the motor is operating at normal speed. Two opposite vertices of the bridge circuit are connected across the armature winding 6 of the alternator 5. The other two vertices of the bridge circuit are connected to the input circuit of the phase detector tube 9.

The phase detector tube 9 comprises a grid element 15, a cathode 16 and an anode 17. Alternating potential from the armature winding 6 of the alternator 5 is applied to the anode 17 of the phase detector tube by means of a transformer 19. A battery 20 divided into sections 21, 22 and 23 is provided for operating the motor 1, for exciting the inductor alternator and for operating the phase detector tube 9 and the amplifier tube 10. It is understood that any other suitable source of current may be provided for operating the system, if so desired. The battery section 21 supplies current to the motor armature 2, the motor field winding 3 and the alternator field winding 7. The battery section 22 supplies filament current to the phase detector tube 9 and the battery section 23 provides biasing potential for the grid 15 of the phase detector tube.

The phase detector tube 9 is coupled to the thermionic amplifier tube 10 by means of a resistance element 25. The phase detector tube impresses potential upon the coupling resistance 25 which varies in accordance with the phase relation between the potentials impressed upon the grid and plate of the detector tube and upon the amplitude of the potential applied to the grid. The phase relation between the potentials on the grid and plate of the phase detector tube varies in accordance with the frequency impressed upon the bridge circuit and in accordance with the speed of the motor.

The pentode amplifier tube 10 comprises a control grid 26, a cathode 27, an anode 28, a screen grid 34 and a suppressor grid 35. Heating current for the filamentary cathode 27 is supplied by the battery section 22. It is to be understood that the cathode 27 may be indirectly heated if so desired. Anode current is supplied by the battery section 21. The screen grid 34 is connected to the battery section 21 and the suppressor grid 35 is connected to the filamentary cathode 27. The output circuit of the pentode tube 5 is connected to the load circuit comprising the regulator field winding 4. The regulating field winding 4 has somewhat of reactance which tends to produce hunting action. This reactance of the regulator field winding 4 is neutralized by the large dynamic impedance of the pentode tube 10.

If the speed of the motor 1 tends to increase the frequency of the current developed by the inductor alternator 5 increases. The increase in frequency of the alternating current varies the phase relation of the potential impressed upon the grid 15 with respect to the potential impressed upon the plate 17 of the phase detector tube 9 to lower the output voltage impressed upon the coupling resistance 25. The lowering of the potential across the coupling resistance 25 lowers the negative biasing potential of the control grid 26 of the pentode tube 10 to increase the current supplied by the tube 10 to the regulator field winding 4. The increased excitation of the field winding 4 opposes the tendency of the motor to increase in speed.

If the motor 1 tends to decrease in speed the frequency of the current developed by the inductor alternator 5 is lowered. The phase relation between the potentials on the grid and the plate of the phase detector tube 9 are so varied as to increase the output voltage from the phase detector tube impressed upon the coupling resistance 25. The negative biasing potential on the control grid 26 of the pentode tube 10 is increased to lower the current flow through the pentode tube and the excitation of the regulator field winding 4. The decreased excitation of the regulator field winding 4 opposes the tendency of the motor to decrease in speed.

A regulator system constructed as above set forth will operate in a very sensitive manner and may have a tendency to hunt even if the reactance of the regulating field winding is neutralized by the large dynamic impedance of a space discharge device having a screen grid. The tendency to hunt in a high precision regulator of this type may be corrected in the manner disclosed in the E. R. Morton Patent 1,788,734 dated January 13, 1931. A resistance element 30 shunted by relatively large capacity condenser 31 is provided in the output circuit of the phase detector tube 9. Upon tendency of the motor to change speed a relatively large corrective excitation is applied to the regulator field winding 4 by the anti-hunting means to immediately oppose such tendency of the motor to change speed. The corrective excitation applied to the regulator field winding is gradually reduced as the condenser 31 discharges. The rate at which the corrective excitation is reduced may be controlled by varying the size of the condenser 31. As set forth in the above mentioned patent to E. R. Morton, a relatively small condenser 33 may be connected across the resistance elements 30 and 25 to by-pass the high frequency components of the phase detector output. Reference may be had to the E. R. Morton Patent 1,788,734 for a complete description of the means for preventing hunting action.

Figure 2:
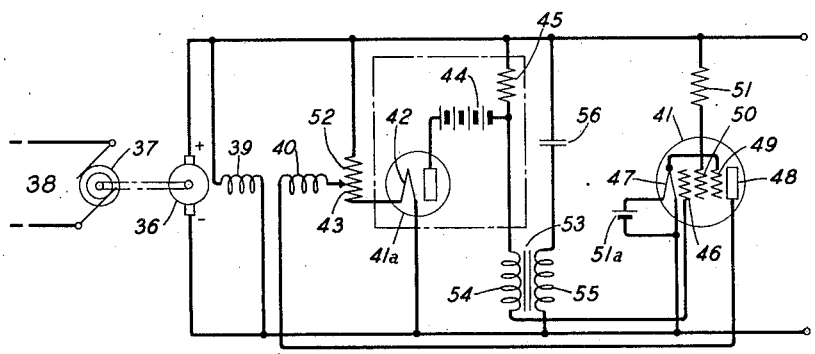
Fig. 2 is a diagrammatic view of a generator voltage regulator system constructed in accordance with the invention.

Referring to Fig. 2 of the drawings, a direct current generator 36 driven by an alternating current motor 37 which receives current from a line 38 is shown connected with a regulating circuit for controlling the generator voltage in accordance with the invention. The generator 36 is excited by means of a main field winding 39. Regulation is obtained by means of an auxiliary field winding 40. The current flow through the regulating field winding 40 is controlled by means of a two-element space discharge device 41a and a pentode space discharge device 41. The two-element space discharge device 41 comprises a cathode 42 connected in series with a resistance 43 across the terminals of the generator 36. Space current is supplied to the device 41 from a battery 44 connected in series with a resistance element 45.

The pentode tube 41 comprises a control grid 46, a filamentary cathode 47, an anode 48, a suppressor grid 49 connected to the cathode 47 and a screen grid 50 connected through an adjusting resistance 51 to the positive terminal of the generator 36. The control grid 46 of the pentode tube 41 is connected to the junction of the battery 44 and the resistance 45 so that its potential with respect to the cathode 47 is determined by the space current of the space discharge device 41. The cathode 47 receives heating current from the battery 51 or equivalent and is directly connected to the negative terminal of the generator 36. The cathode 47 may be indirectly heated if so desired. The anode 48 is connected through the regulating field winding 40 and a portion of the resistance 43 to the positive terminal of the generator 36.

The manner in which the above circuit operates is as follows: The filament of the two-element tube 41a is operated at a temperature below normal so that the space current of the tube is limited by the electron emission and is independent of the plate voltage. As is well known, a tube under these conditions gives a relatively large change in the space current for a small change in the filament current, the ratio being of the order of 20 to 1. The filament 42 is connected across the terminals of the generator in series with the resistance 43 so that if the voltage of the generator tends to increase the filament 42 will tend to become hotter and the space current through the device 41a will increase. The increased current flow through the device 41a causes an increased drop in the resistance 45. The difference between the value of this potential drop and the voltage of the generator is supplied to the control grid 46 of the pentode tube 41. The tendency to increase in the generator voltage therefore causes the control grid of the pentode tube 41 to become more negative, thus producing a decrease in the space current of the pentode tube and of the current through the field winding 40, thereby weakening the field of the generator and restricting the tendency of the voltage to increase. The circuit is so arranged that the space current of the pentode tube 41 passes through a portion 52 of the resistance 43. Therefore, the voltage across the cathode 42 and, consequently, the current therethrough is determined by the drop in the portion 52. For example, an increase in the impedance of the pentode tube 41 produced by an increase in the voltage of the generator 36 will cause a decrease in the drop in the portion 52 and therefore an increase in the current through the cathode 42, thus giving a cumulative regulating effect. Adjusting the percentage of resistance 43 included in the portion 52 by adjusting the point to which the terminal of the winding 40 is connected, it is possible to secure an increase in the generator voltage with load, flat regulation or decrease.

In order to still further limit the tendency of the generator voltage to fluctuate a transformer 53 may be used, the secondary winding 54 of which is connected to the control grid 46 of the pentode tube 41, the primary winding 55 being connected in series with a condenser 56 across the generator terminals. If the voltage of the generator tends to fluctuate an electromotive force is developed in the secondary of the transformer 53 which is proportional not to the absolute value of the generator voltage but to the rate of change to that voltage. Therefore, if the generator voltage tends to change in either direction, the transformer 53 applies an electromotive force on the control grid 46 of the pentode tube in such a direction as to oppose the change and prevent hunting action.

The field winding 40 of the generator 36 has a large reactance and such reactance acts the same as inertia in the mechanical governor to produce hunting action. The pentode tube 41 is provided with a large dynamic impedance which serves to neutralize the effect of the reactive impedance of the field winding.

Figure 3:
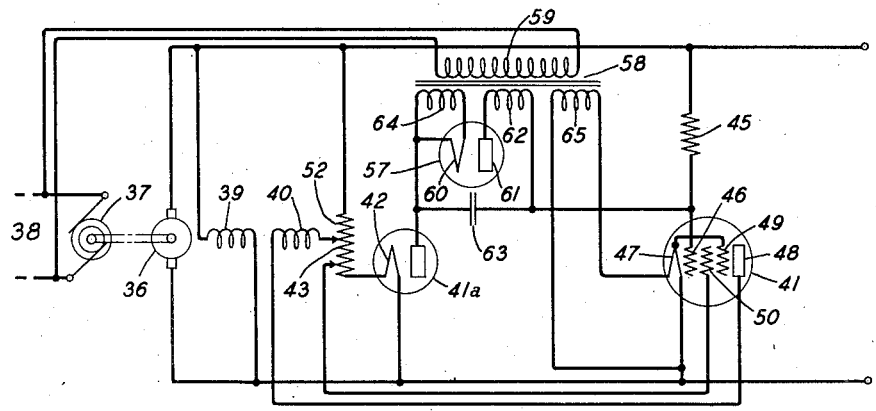
Fig. 3 is a diagrammatic view of a modification of the generator voltage regulator system shown in Fig. 2 of the drawings.

In the modification of the invention shown in Fig. 3 of the drawings, the battery 44 shown in Fig. 2 is replaced by a circuit arrangement for rectifying alternating current from the line 38. This circuit arrangement comprises a two-element rectifier tube 57 and a transformer 58, the primary 59 of which is connected to the alternating current source 38. The anode of the space discharge device 41a is connected to the cathode 60 of the device 57, the plate 61 of which is connected through the secondary winding 62 of the transformer 58 to the control grid 46 of the pentode tube 41. A condenser 63 is shunted across the device 57 and the secondary winding 62 to eliminate the alternating current. The cathodes 60 and 47 are shown heated by means of alternating current supplied from the secondary windings 64 and 65 inductively associated with the primary winding 59. In many respects the circuit of Fig. 3 is the same as that of Fig. 2. The pentode tube 41 operates in the same manner as the pentode tube shown in Fig. 2, except that the screen grid 50 in the circuit shown in Fig. 3 is connected to the resistance 43 so that the screen grid current adds to the plate current for compensating the regulating operation.

Figure 4:
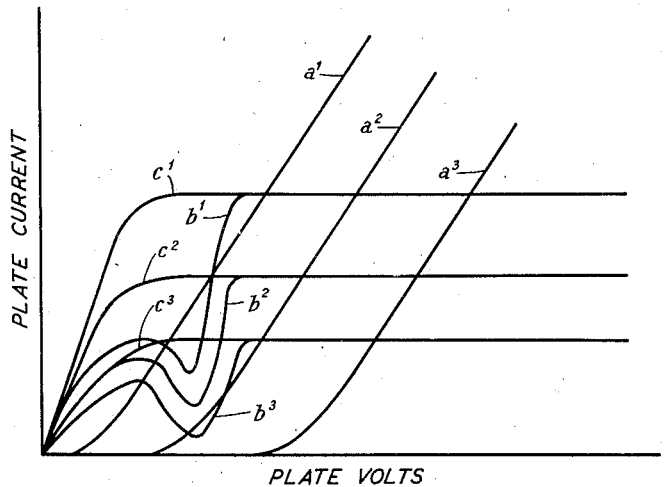
Fig. 4 is a set of curves showing the relation of the place current to the plate voltage in a three-element tube, a four-element tube and a five-element tube.

Referring to Fig. 4 of the drawings, curves are shown to compare tubes having three elements, four elements and five elements. The ordinates of the curve represent plate current and the abscissae of the curves represent plate voltage. Curves a1, a2 and a3, respectively, represent the characteristic of a three-element tube where the grid voltage is zero, where the grid voltage is average and where the grid voltage is a maximum. In the curves a1, a2 and a3 it will be noted that a small change in the plate voltage produces a large change in the plate current. Curves b1, b2 and b3 represent the characteristic of a four-element tube having a screen grid where the grid voltage is zero, where the grid voltage is average, and where the grid voltage is a maximum. In a tube of this type having a screen grid it will be noted that the plate current is constant for variations of plate voltage over a wide range. Curves c1, c2 and c3 represent the characteristic of a pentode tube which are similar to the curves b1, b2 and b3 of a four-element tube except that the range is extended. The large dynamic impedance of a four-element tube or a five-element tube serves to compensate for inductive reactance in a load circuit. In a regulator system of the vacuum tube type a space discharge device having a screen grid and connected to the load circuit serves to neutralize the inductive reactance in the load circuit.

Modifications in the systems and in the arrangement and location of parts may be made within the spirit and scope of the invention and such modifications are intended to be covered by the appended claims.

What is claimed is:

1. In a regulator, a dynamo-electric machine having armature and field windings, a space discharge device comprising a control grid, a screen grid, a cathode and an anode, means for impressing potential on said control grid according to a characteristic of said machine and with a more than proportional change for a change in the machine characteristic, and means for controlling one of said machine windings directly by said device to maintain the characteristic of the machine substantially constant, while maintaining the device output current independent of output voltage changes due to reactance in the device output circuit during transient device operations to improve the regulator stability.

2. In a regulator, a dynamo-electric machine having armature and field windings, a pentode space discharge device comprising a control grid, a screen grid, a suppressor grid, an anode and a cathode, said device having a large dynamic impedance, means for impressing potential on said control grid according to a characteristic of said machine and with a more than proportional change for a change in the machine characteristic, and means for controlling a field winding of said machine connected to said anode and cathode to maintain the characteristic of said machine substantially constant, the large dynamic impedance of said device serving to maintain the device output current independent of output voltage changes due to reactance in the device output circuit during transient device operations to improve the regulator stability.

3. In a regulator, a dynamo-electric machine having armature and field windings, a space discharge device comprising a control grid, a screen grid, a cathode and an anode, said device having a large dynamic impedance, means for impressing potential on said control grid according to a characteristic of said machine and with a more than proportional change for a change in the machine characteristic, and means for controlling a field winding of said machine connected to said anode and cathode to maintain the characteristic of said machine substantially constant, the large dynamic impedance of said device serving to maintain the device output current independent of output voltage changes due to reactance in the device output circuit during transient device operations to improve the regulator stability.

4. In a regulator, a circuit having electrical characteristics, a space discharge device comprising a control grid, a screen grid, a cathode and an anode, means for impressing potential on said control grid according to a characteristic of said circuit and with a more than proportional change for a change in said characteristic, and means governed by said device to maintain said circuit characteristic constant while maintaining the device output current substantially independent of output voltage changes due to reactance in the device output circuit during transient device operations to improve the regulator stability.

5. In a regulator, a circuit having electrical characteristics, a pentode space discharge device comprising a control grid, a screen grid, a suppressor grid, an anode and a cathode, said device having a large dynamic impedance, means for impressing potential on said control grid according to a characteristic of said circuit and with a more than proportional change for a change in said characteristic, and means comprising a reactive element governed by said device to maintain said circuit characteristic constant while maintaining the device output current substantially independent of output voltage changes due to the reactance of said element during transient device operations to improve the regulator stability.

6. In a regulator, a dynamo-electric machine having an armature winding and a regulating field winding, means comprising a space discharge device having the current flow therethrough controlled in accordance with a characteristic of said machine and effecting a more than proportional change in the current flow for a change in said characteristic, a second space discharge device comprising a control grid, a screen grid, a cathode and an anode, means for controlling said second device according to the current flow through said first device, and means for directly controlling said regulating field winding by said second device to maintain the characteristic of said machine constant while compensating for the reactance of said field winding.

7. In a regulator, a dynamo-electric machine having an armature winding and a field winding, and means for controlling one winding of said machine according to a characteristic of said machine to maintain said characteristic substantially constant, said means comprising a space discharge device with a large dynamic impedance having the output circuit thereof in the same series current flow circuit with the controlled winding and said device having a control grid, a screen grid, a cathode and an anode.

8. In a regulator, a dynamo-electric machine having an armature winding and a field winding, a source of alternating current having a frequency varying according to the speed of said machine, a phase detector space discharge device, means for operating said phase detector tube according to the frequency of said alternating current, a space discharge amplifier for coupling said phase detector device to a winding of said machine for controlling the machine to maintain the speed thereof constant, said amplifier device having a large dynamic impedance and comprising an anode, a cathode, a control grid, a screen grid and a suppressor grid for maintaining the amplifier output current substantially independent of output voltage changes due to the reactance of said machine winding during transient amplifier operations to improve the regulator stability.

9. In a regulator, a dynamo-electric machine having an armature winding and a field winding, a source of alternating current having frequency varying according to the speed of said machine, a space discharge amplifier having a large dynamic impedance and comprising an anode, a cathode, a control grid and a screen grid, and means controlled according to the frequency of said source for impressing potential on said control grid with a more than proportional change, the output circuit of said device being connected to said field winding for maintaining the speed of said machine substantially constant while maintaining the device output current substantially independent of output voltage changes due to the reactance of the field winding to improve the regulator stability.

10. In a regulator, a dynamo-electric machine having an armature winding and a field winding, a two-element space discharge device having the filament thereof heated according to a characteristic of said machine, a second space discharge device comprising a control grid, a screen grid, an anode and a cathode and having a large dynamic impedance, and means for impressing potential on said control grid according to the space current of said first device, the anode cathode circuit of said second device being connected in circuit with the field winding of said machine to maintain said characteristic substantially constant and the dynamic impedance of said second device serving to maintain the output current of said second device substantially independent of voltage changes in the output circuit due to the reactance of said field winding.

11. In a regulator, a generator having an armature winding and a field winding, a two-element space discharge device having the filament thereof heated according to the voltage of said generator, a second space discharge device comprising control grid, a screen grid, a suppressor grid, an anode and a cathode and having a large dynamic impedance, and means for impressing potential on said control grid according to the space current of said first device and for connecting the output circuit of said second device to the generator field winding to maintain the generator voltage substantially constant, the dynamic impedance of said second device serving to maintain the output current of said second device substantially independent of voltage changes in the output circuit due to the reactance of said field winding.

EDMUND R. MORTON.